United States Patent
Thiyagarajan et al.

(10) Patent No.: US 10,089,633 B2
(45) Date of Patent: Oct. 2, 2018

(54) REMOTE SUPPORT OF COMPUTING DEVICES

(71) Applicant: Amazon Technologies, Inc., Reno, NV (US)

(72) Inventors: Pirasenna Thiyagarajan, Cupertino, CA (US); James Arthur Wilson, San Francisco, CA (US); Jennifer Piksum Yick, San Jose, CA (US); Rexford Jay Tibbens, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 941 days.

(21) Appl. No.: 13/966,007

(22) Filed: Aug. 13, 2013

(65) Prior Publication Data

US 2015/0052067 A1    Feb. 19, 2015

(51) Int. Cl.
  *G06F 3/00*      (2006.01)
  *G06Q 30/00*    (2012.01)

(52) U.S. Cl.
  CPC .................. *G06Q 30/016* (2013.01)

(58) Field of Classification Search
  CPC ... G06F 19/3406; B25J 9/1689; G06Q 30/016
  USPC ................. 715/744, 753, 751, 754
  See application file for complete search history.

(56) References Cited

U.S. PATENT DOCUMENTS

| | | | |
|---|---|---|---|
| 5,301,191 A * | 4/1994 | Otani ................... | H04J 3/1605 348/E7.082 |
| 5,798,752 A * | 8/1998 | Buxton .................. | G06F 3/038 345/157 |
| 5,900,877 A | 5/1999 | Weiss et al. | |
| 7,213,211 B1 * | 5/2007 | Sanders ................... | G09B 5/08 715/753 |
| 7,565,338 B2 | 7/2009 | Beniaminy et al. | |
| 8,010,901 B1 * | 8/2011 | Rogers ...................... | G06F 9/54 709/204 |
| 8,341,530 B1 | 12/2012 | Inabinet et al. | |
| 8,626,675 B1 | 1/2014 | Satish | |

(Continued)

FOREIGN PATENT DOCUMENTS

| | | |
|---|---|---|
| WO | 2005069112 | 7/2005 |
| WO | WO2013133843 A1 | 9/2013 |

OTHER PUBLICATIONS

Author Unknown, "Representative Guide 13.1 Enterprise Licensing," BOMGAR, 77 pages (Nov. 4, 2013).

(Continued)

*Primary Examiner* — Andrey Belousov
(74) *Attorney, Agent, or Firm* — K&L Gates LLP (57) ABSTRACT

A customer support application provides screen sharing of the user's computing device with a remote customer support agent, thereby enabling the customer support agent to view the content displayed on the user's device. The customer support agent can provide guidance to the user by transmitting support content back to the user's computing device, where the support content is displayed as an overlay on top of the user's normal user interface content. The screen sharing and support content may be supplemented with live audio and video communications between the user and the remote customer support agent, and the multiple modes of communication may be prioritized to maintain quality in the preferred communication mode.

25 Claims, 5 Drawing Sheets

(56) References Cited

U.S. PATENT DOCUMENTS

| | | | |
|---|---|---|---|
| 8,924,884 | B2 | 12/2014 | Bank et al. |
| 2002/0184325 | A1 | 12/2002 | Killcommons et al. |
| 2005/0180338 | A1 | 8/2005 | Pirila et al. |
| 2006/0277096 | A1 | 12/2006 | Levitus |
| 2007/0124601 | A1 | 5/2007 | Singh et al. |
| 2007/0127696 | A1 | 6/2007 | White |
| 2007/0234219 | A1* | 10/2007 | Bhattaru ............ G06F 19/3406 715/744 |
| 2008/0168135 | A1 | 7/2008 | Redlich et al. |
| 2008/0168167 | A1 | 7/2008 | Carlson et al. |
| 2008/0189612 | A1 | 8/2008 | Zhang et al. |
| 2009/0274070 | A1 | 11/2009 | Mukherjee et al. |
| 2010/0010673 | A1* | 1/2010 | Wang .................. B25J 9/1689 700/264 |
| 2010/0205530 | A1 | 8/2010 | Butin et al. |
| 2010/0257577 | A1 | 10/2010 | Grandison et al. |
| 2011/0115816 | A1 | 5/2011 | Brackney |
| 2011/0249081 | A1 | 10/2011 | Kay et al. |
| 2012/0027195 | A1 | 2/2012 | Shaffer et al. |
| 2012/0116982 | A1 | 5/2012 | Yoshida et al. |
| 2012/0316955 | A1 | 12/2012 | Panguluri et al. |
| 2012/0317487 | A1 | 12/2012 | Lieb et al. |
| 2013/0030948 | A1 | 1/2013 | Fisher, Jr. |
| 2013/0091205 | A1 | 4/2013 | Kotler et al. |
| 2013/0122938 | A1 | 5/2013 | Sharif-Ahmadi et al. |
| 2013/0147787 | A1 | 6/2013 | Ignatchenko et al. |
| 2013/0151353 | A1 | 6/2013 | Cobb et al. |
| 2013/0151999 | A1 | 6/2013 | Seul |
| 2013/0218783 | A1 | 8/2013 | Anand |
| 2013/0263288 | A1 | 10/2013 | Palanichamy et al. |
| 2013/0330054 | A1 | 12/2013 | Lokshin |
| 2014/0007222 | A1 | 1/2014 | Qureshi et al. |
| 2014/0052645 | A1 | 2/2014 | Hawes et al. |
| 2014/0089113 | A1 | 3/2014 | Desai et al. |
| 2014/0129458 | A1 | 5/2014 | Damnjanovic et al. |
| 2014/0222865 | A1 | 8/2014 | Casey et al. |
| 2015/0052122 | A1 | 2/2015 | Landry et al. |
| 2015/0156269 | A1 | 6/2015 | Yutani |
| 2015/0242419 | A1 | 8/2015 | Holmquist et al. |

OTHER PUBLICATIONS

PCT Application No. PCT/US2015/022136, Search Report and Written Opinion dated Jun. 25, 2015, 10 pages.

PCT Application No. PCT/US2014/050701, Search Report and Written Opinion dated Nov. 12, 2014, 9 pages.

Author Unknown, "Amazon.com Help: Connect to a Tech Advisor with the Mayday Button," www.amazon.com Available at www.amazon.com/gp/help/customer/display.html?nodeId=201349900, 2 pgs., (printed Mar. 26, 2014).

Author Unknown, "Amazon.com Help: Mayday: Frequently Asked Questions," www.amazon.com Available at www.amazon.com/gp/help/customer/display.html?nodeId=201364620, 2 pgs., (printed Mar. 26, 2014).

Author Unknown, "eBLVD Remote Desktop User Guide," ENC Technology Corp., Available at eBLVD.com, 46 pgs., (2012-2013).

Author Unknown, "How do I use Problem Steps Recorder," Available at http://windows.microsoft.com/en-us/windows7/how-do-i-use-problem-steps-recorder, 2 pgs., (printed Mar. 27, 2014).

Author Unknown, "RERAN—Record and Replay for Android," Available at http://www.androidreran.com/, 3 pgs., (printed Mar. 27, 2014).

Author Unknown, "Session Recording," Available at http://www.islonline.com/remote-support/features/session-recording.htm?hl=no, 2 pgs., (printed Mar. 27, 2014).

Dale, "Recording and replaying events with Android," Lardcave.net, www.lardcave.net, Available at http://www.lardcave.net, 2 pgs., (printed Feb. 26, 2014).

Fisher, "Steps Recorder (What It Is and How to Use It)," About.com Computing PC Support, Available at http://pcsupport.about.com/od/termsp/p/problem-steps-recorder.htm, 1 pg., (printed Mar. 27, 2014).

Gomez et al., RERAN: Timing- and Touch-Sensitive Record and Replay for Android, ICSE pp. 72-81, (2013).

Kaiser et al, "Step-by-Step Guide to Remote Assistance," Microsoft Corp., (Jul. 1, 2001).

Extended European Search Report for European patent application EP14836015.9; dated Dec. 7, 2016.

Braunstein; ActionScript 3.0; Jun. 12, 2010; pp. 39-50 and 409-427; 2nd Edition; Wiley India PVT Ltd.

Author unknown; Summons to Attend Oral Proceedings Pursuant to Rule 115(1) EPC in connection with European Patent Application No. 14836015.9; Jan. 11, 2018; 9 pgs.

\* cited by examiner

REMOTE SUPPORT OF COMPUTING DEVICES

BACKGROUND

The use of computing devices by users having varying levels of technical expertise generates new opportunities for providing improved user experiences through convenient and effective customer support. In-person customer support at retail locations and computer service centers can provide a high level of service, but travelling to a physical location may be inconvenient for the customer and the cost of maintaining the staff and facilities at such a location can be undesirably high. Customer support by e-mail might be more convenient as it permits the user to initiate the service request from any location, but results in undesirable delays due to the asynchronous nature of e-mail communication. Telephone support may provide improved response time and a more personal interaction with the support agent, but due to varying user levels of technical expertise and the limitations of voice communications, it may be challenging for the user to clearly communicate the problem being experienced and challenging for the support agent to clearly communicate the steps needed to resolve the problem.

Accordingly, there is a need for improved systems and methods for providing remote support for computing devices.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure provide improved systems and methods for remote support for computing devices. A support application provides screen sharing of the user's computing device with a remote customer support agent, thereby enabling the customer support agent to see exactly what the user is seeing. In addition, the customer support agent can utilize an application on the agent's computing device to generate graphics to help guide the user. These graphics are then transmitted back to the user's computing device, where the graphics are displayed on top of the user's normal user interface.

In accordance with some embodiments, the support application can also provide screen sharing in conjunction with a live voice chat between the user and the remote customer support agent, and a streaming video image of the customer support agent on the user's computing device. The quality of communication between the user and the customer support agent on these three channels (e.g., screen sharing, voice, and video) is monitored, and when a degradation in quality is detected, the voice channel is prioritized by modifying one or more quality of service parameters of the other communication channels.

Figure 1:
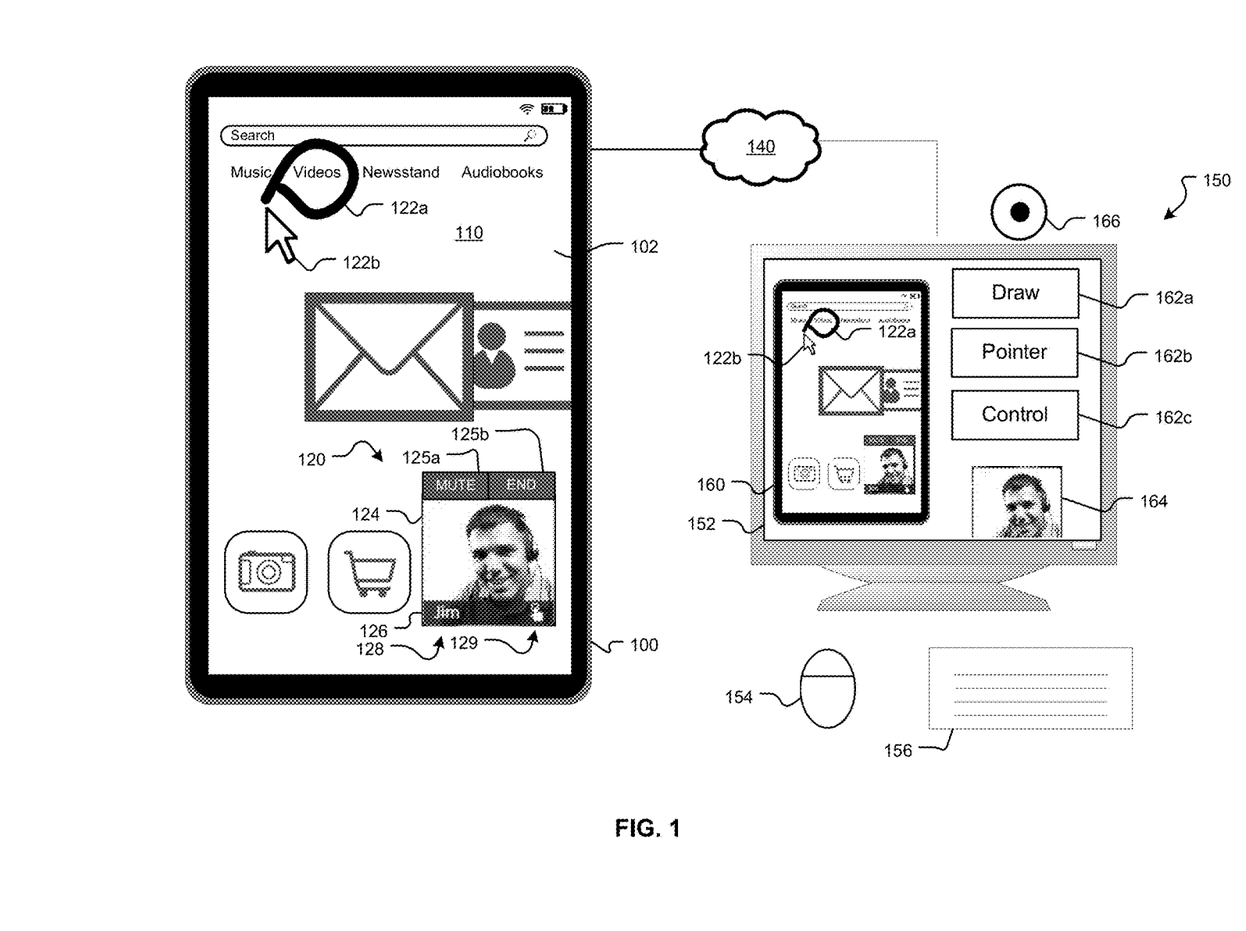
FIG. 1 is a block diagram illustrating a communication system, in accordance with embodiments of the present invention.

FIG. 1 is a block diagram illustrating a communication system, in accordance with embodiments of the present invention. A user utilizing a first computing device, such as a tablet computing device 100, connects to a second computing device, such as the customer support agent computing device 150, via a network 140. The network 140 includes, for example, the Internet, intranets, extranets, wide area networks (WANs), local area networks (LANs), wired networks, wireless networks, or other suitable networks, or any combination of two or more such networks.

The tablet computing device 100 includes a touch-sensitive display component 102, which produces user interface ("UI") content 110, such as an operating system user interface or the interface of one or more software applications that may run on the tablet computing device 100. When the user launches a customer support application on the tablet computing device 100 and initiates a screen sharing function, the user interface content 110 currently being displayed on the tablet computing device 100 is transmitted to the support agent computing device 150.

The support agent computing device 150 runs a customer support application, which then displays the screen sharing image 160 of the content 110 displayed on the user's computing device 100 on the agent's display 152. This screen sharing image 160 enables the customer support representative to better assist the user by presenting the representative with a live feed of the user's computing device 100. Many tablet computing devices are configured to dynamically change the user interface aspect ratio, depending on the orientation in which the device is held by the user. Therefore, the user interface may switch from portrait to landscape mode in the middle of a support session. The customer support application is configured to adjust the screen sharing image 160 to reflect the current orientation of the user computing device 100. Although the user interface for many desktop computers are configured to adjust from landscape to portrait mode, this adjustment is typically done much more frequently by tablet computer users due to the ease with which the orientation may be changed. In addition, many tablet computing applications only operate in a single orientation mode. Therefore, if the user is browsing an application menu in landscape mode, and launches a portrait-only application, the user interface (and screen sharing image 160) will automatically change to portrait mode.

The customer support application may also provide the agent with one or more support tools 162a-162c, which the agent may utilize to respond to the user's inquiries or requests for assistance. In the illustrated embodiment, the customer support application includes a drawing tool 162a, a pointer tool 162b, and a control tool 162c. The agent may utilize peripheral input devices of the agent computing device 150, such as, for example, a mouse 154 and a keyboard 156, to select one of the tools 162*a*-162*c* and then interact with the screen sharing image 160 using that tool to produce the desired result on the user's computing device 100.

The drawing tool 162*a* provides a graphics editor function that enables the agent to utilize one or more graphics tools to create graphical elements 122 to be displayed on top of the user's content 110. The graphics tools may enable the agent to draw freeform and/or non-freeform shapes, such as a line 122*a*, curve, or box, or to add text or other images. These graphical elements 122 can be transmitted as, e.g., raster or vector graphics images to the user's computing device 100, where they are displayed on top of to the user's computing device 100. The agent may use these graphical elements 122 to provide visual guidance to the user, such as to highlight a button to select or a touch input to perform. For example, if the agent wishes to instruct the user to swipe across a certain portion of the screen, the agent may use the drawing tool to draw a line in the direction of the swipe to be performed. The graphical elements 122 can be transmitted as a live, streaming feed to the user's computing device 100 as they are generated by the agent, so the user can see an animated display of the graphical elements 122. Accordingly, the user can view the line 122*a* being drawn, and thereby see the movement of the swipe across the display 102. In other embodiments, the graphical elements 122 may be transmitted as static images to the customer's computing device 100. These static images can be drawn by the customer support agent using the agent's computing device 150 and periodically transmitted to the customer's computing device 100 automatically or manually by the agent.

The pointer tool 162*b* provides the agent with a graphical element comprising a pointer 122*b* that the agent can move about the screen without leaving a trail or other persistent image, as would occur if using the drawing tool 162*a*. The agent may move the pointer 122*b* over the surface of the user's content 110 to draw the user's attention to various elements displayed. The pointer tool 162*b* provides a transient graphical element that the user can observe as it is manipulated by the agent, but does not leave a persistent image on the display 102. The pointer 122*b* can function in a similar fashion as the mouse pointer used in traditional graphical user interfaces for selecting items. However, when the user's computing device 100 is a touch-screen computing device, the operating system may be adapted to primarily or solely receive touch inputs, and not utilize a pointer cursor. Therefore, the pointer cursor may not be an integral function of the user's computing device 100. In addition, when the user's computing device 100 does provide for pointer functionality, it may be desirable for the customer support agent to have a separate pointer 122*b* controlled by the customer support agent, while enabling the user to simultaneously operate the user's pointer function, such as, for example, to carry out the instructions provided by the customer service agent. The ability to show the user what to do, and then permit the user to perform those tasks on his or her own can provide a much more effective training function than if the customer service agent were to perform those tasks directly.

In other situations, it may be desirable for the customer service agent to perform tasks directly on the user's computing device 100. The control input tool 162*c* provides the agent with the ability to produce inputs that are received by the user's computing device 100 and recognized as user inputs as if the user had provided those inputs using, for example, the touch-screen display 102. The control input tool 162*c* may provide the agent with a pointer or other cursor that the agent may move across the surface of the content 110 using the mouse 154, with touch inputs being generated using, for example, the buttons on the agent's mouse 154 or keyboard 156. The control input tool 162*c* may be useful when the agent wishes to perform functions or tasks directly onto the user's computing device 100, rather than merely explain to the user what the user should do, as may be the case when utilizing the drawing tool 162*a* or pointer tool 162*b*. This may be particularly desirable when the user does not wish to be trained on how to perform a task, but would rather have the task completed without effort on the user's part.

In other embodiments, the customer support application may provide the customer support agent with other support tools not shown in FIG. 1. For example, the customer support application may include a library of pre-generated support graphics which may be selected by the customer support agent to be transmitted for display on the user's computing device 100. These pre-generated support graphics may comprise static images and/or animations. This may be particularly useful for teaching users the solutions to common problems. For example, after a user indicates that he needs assistance with connecting to a wireless network, the customer support agent may select a pre-generated graphic or animation that teaches the user how to access the appropriate settings menu for connecting to a wireless network. In some embodiments, the library of pre-generated support graphics displayed on the customer support application are selected based on information received from the user's computing device 100, such as the model type, operating system software running on the computing device 100, and orientation of the display (e.g., landscape or portrait). This may be useful when the sequence of steps and/or locations of menus and icons may vary between different device models, operating system revision level, and orientation of display. By utilizing this user information to select the appropriate pre-generated support graphics made available to the customer support agent, the customer support agent can provide a more precise and user-specific support experience.

In yet other embodiments, the support tools provided by the customer support application may include support graphics that provide guidance to the user on how to provide gesture inputs to the user's computing device 100. In conventional desktop computer operating systems, the user's inputs to the computer are limited by the inputs that may be provided by the keyboard and mouse. In touch-sensitive computing devices, more complex user inputs may be used when interacting with the computing device, including the use of multiple contact points (e.g., using 2, 3, or more fingers contacting the touch-sensitive display), different types of movements across the surface of the display (e.g., touches, swipes, pinches, reverse pinches), and different degrees of contact with the display (e.g., hovering over the display without contact, varying degrees of pressure on the surface of the display). These touch-based user inputs may be more difficult to illustrate using simple graphics, such as lines, circles, and arrows. It may be desirable for the customer support application to be provided with pre-generated support graphics that provide guidance on generating various user inputs. For example, one pre-generated support graphic to teach a reverse pinch input may comprise an animation of a thumb and index finger contacting the display and expanding outwards. The customer support agent may select this support graphic from a library of pre-generated support graphics, and position the support graphic onto a desired location in the screen sharing image 160 of the user's computing device 100. The user will then see the animated fingers on top of the UI content 110, showing the user how to touch the screen with his fingers to generate the desired input.

In yet other embodiments, different forms of communication between the customer support agent and the user may be provided. For example, the live chat between the customer support agent and the user may be text-based, without audio or video communication. Text-based communication may be more desirable in situations where data communications between then user and support agent is limited or expensive.

The support agent computing device 150 may also include a webcam 166 for capturing a live streaming video of the customer service agent using the computing device 150. The customer support application may include a video image 164 so that the agent, and the same image will be transmitted to the user's computing device 100 and shown in the video image portion 124 of an agent interface element 120. The agent interface element 120 may contain additional graphical elements and/or controls, such as, for example, a control portion 126. In the illustrated embodiment, the control portion 126 includes an information portion 128, displaying text, such as the agent's name, and one or more control icons 129, which, when selected by the user, can perform various functions. In this embodiment, if the user wishes to relocate the position of the agent interface element 120, the user can select the hand control icon 129 and drag the agent interface element 120 across the display. Additional controls 125a-125b may also be displayed to enable the user to perform additional functions, such as muting the live chat using mute control 125a and ending the support session using end control 125b.

Figure 2:
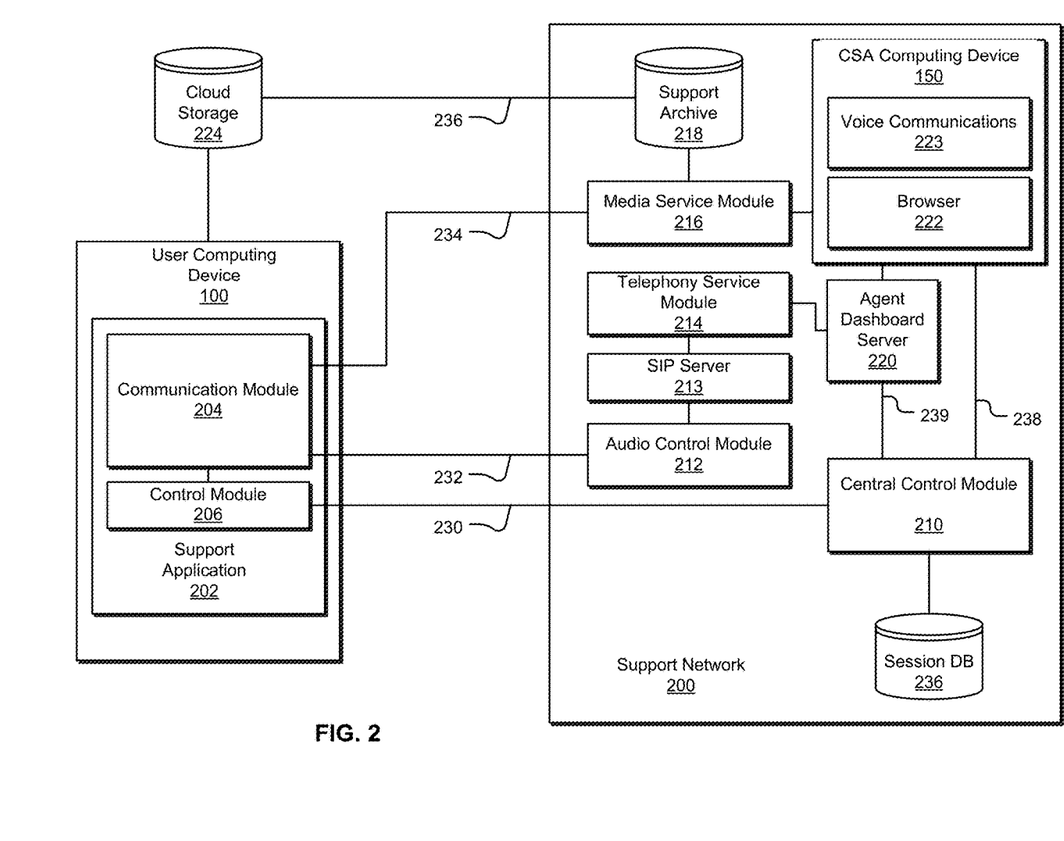
FIG. 2 is a block diagram illustrating an exemplary environment in which embodiments of the present invention may be implemented.

FIG. 2 is a block diagram illustrating an exemplary environment in which embodiments of the present invention may be implemented. The user's tablet computing device 100 is provided with a processing element and memory configured to execute various software applications, including a support application 202 comprising a communication module 204 and a control module 206. The support agent computing device 150 is provided as part of a support network 200, which includes a central control module 210, an audio control module 212, a Session Initiation Protocol (SIP) server 213 (or other telecommunications server), a telephony service module 214, a media service module 216, a support archive 218, and an agent dashboard server 220. The support agent computing device 150 also includes a processing element and memory configured to execute various software applications, including a web browser application 222. The support agent computing device 150 may also include a voice communications module 223, which may include a voice communications headset or other microphone and speaker hardware, and corresponding software for handling voice communications between the agent computing device 150 and the user computing device 100. Although various components are illustrated as discrete blocks in FIG. 2, it is to be understood that the blocks are merely illustrative and the functionality of each component may be implemented using software executing one or more computing devices, such as a series of servers located in different physical locations.

The user computing device 100 may include a Linux-based operating system, such as the Android operating system by Google, Inc., and the support application 202 may comprise a browser-based software application operating in the applications layer of the operating system. The communication module 204 may implement, for example, a protocol for browser-based real-time communication, such as WebRTC. The communication modules 204 enables the real-time one-way or two-way media streaming between the browser-based support application 202 running on the user computing device 100 and the browser application 222 on the support agent computing device 150. When the user computing device 100 is running the Android operating system, the communication module 204 may utilize a WebView element to render the graphical content provided by the support agent computing device 150 and displayed on top of the UI content 110.

The central control module 210 may comprise a management application running on a computer server in the support network 200. The central control module 210 handles control and communication between a plurality of user computing devices and support agent computing devices, and other components of the support network 200. When a user launches the support application on a computing device (e.g., support application 202 on computing device 100), the support application 202 establishes a connection with the central control module 210 via a session control channel 230. The central control module 210 initiates a new support session and transmits the session information to the agent dashboard server 220 via communications channel 239. The communications channel 239 is used to transmit session status and control information to the support application 202 and may also be used to receive information to initiate an audio communication session between the user computing device 100 and the agent computing device 150. The agent dashboard server 220, in turn, assigns the new support session to one of the customer support agent computing devices (e.g., customer support agent computing device 150). The central control module 210 stores information regarding all of the customer support sessions provided by the support network 200 in session database 236. The central control module 210 also maintains an agent control channel 238 with the agent browser 222. The agent control channel 238 may be used to transmit graphics between the user computing device 100 and the agent computer device 150 and may also be used to transmit signal information to establish the media session between the user computing device 100 and the agent computing device 150.

The audio control module 212 manages the voice communication between the user computing device 100 and the agent computing device 150. The audio control module 212 may comprise a session border controller (SBC) to manage Voice Over IP communications between the user computing device 100 and the agent computing device 150, including management of quality of service (QoS) parameters, such as rate limiting, bitrate management. The audio control module 212 receives the voice data via audio channel 232 and passes the voice data to the telephony service module 214. The telephony service module 214 then routes the voice communication to the corresponding agent computing device 150 via the agent dashboard server 220. The audio channel 232 can establish the voice session using a signaling communications protocol such as the Session Initiation Protocol (SIP) and a transport protocol such as the Real-time Transport Protocol (RTP).

The media service module 216 handles the graphical media streaming between the user computing device 100 and the agent computing device 150. The media service module 216 may be implemented as a computer server implementing a Traversal Using Relays around NAT ("TURN") protocol for handling data over TCP and UDP connections. The graphical media streaming handled by the media service module 216 can include one or more of the screen sharing graphics from the user computing device 100, the graphical elements 122 from the agent computing device 150, and the video image 164 of the agent. The media streaming between the communication module 204 and the media service module 216 via WebRTC can be provided over a media channel 234. In some embodiments, the graphical elements 122 from the agent computing device 150 may be transmitted from the central control module 210 to the control module 206 on the user computing device 100 via session control channel 230.

The support archive 218 comprises a storage system that can be used to store all of the media exchanged during a customer support session between the user computing device 100 and agent computing device 150. The stored media may be used for training and audit purposes, such as to review the performance of the various customer service agents in the support network 200. In accordance with some embodiments of the present invention, the stored session data may be made available to the user so that the user may review a recording of a previously-held customer support session. This can be particularly helpful to users who wish to review the instructions provided by the customer service agent. In some embodiments, after a customer service session is completed, the stored session data, including one or more of the audio, video, screen sharing, and graphical elements from the agent, may be transmitted to the user's cloud storage server 224, for later retrieval and playback by the user. The stored session data may be stored as a video file that can be played back and viewed by the user exactly as the user had experienced it live during the customer service session.

Communication Prioritization

In accordance with embodiments of the present invention, a customer support agent at computing device 150 may have multiple simultaneous modes of communication with the user at computing device 100, and the transmission of one or more of those multiple modes of the communication may be prioritized over the other modes of communication, depending on the adequacy of the network communications between the user computing device 100 and the agent computing device 150. As described above, those communication modes may include voice communication via audio channel 232, screen sharing of the user computing device 100 to the agent's computing device 150 via media channel 234, graphical elements generated by the customer service agent and transmitted to the user computing device 100 via session control channel 230, and streaming video images of the customer service agent captured by the webcam 166 and transmitted to the user computing device 100 via medial channel 234.

In some embodiments, it may be desirable that the voice communication between the user and the agent be provided with a higher priority than the other modes of communication. In many situations, maintaining reliable voice contact is the most effective way of providing customer service, and degradation in voice communications can be particularly frustrating for the end user. Accordingly, when a reduction in quality in data communications between the computing device 100 and computing device 150 is detected, the transmission parameters for one or more of the other modes of communication may be modified, temporarily suspended, or terminated, so as to preserve the quality of the voice communication.

The session control channel 230 may be used to communicate detected changes in communication quality and/or to communicate adjustments in transmission parameters for the one or more other modes of communication. Most communication protocols include some form of quality detection methods, which may monitor different aspects of the communication, such as, for example, service response time, loss, signal-to-noise ratio, cross-talk, echo, interrupts, frequency response, loudness levels, bit rate, etc. The quality detection method may also comprise feedback from the user or agent regarding their respective perceptions of communication quality. Quality status detected by the agent's browser 222 can be communicated to the central control module 210 via the agent control channel 238, and quality of service status detected by the user's support application 202 can be communicated to the central control module 210 via the session control channel 230.

The central control module 210 may be configured to monitor the communications between the user computing device 100 and the agent computing device 150 to maintain a minimum level of communications quality. In some embodiments, if the quality of voice communication drops below a predetermined level, then the transmission parameters of one or more of the other modes of communication is adjusted. In other embodiments, if the quality of communications on one or more of the modes of communication drops below a predetermined level, then the transmission parameters of one or more of the other modes of communications can be adjusted in accordance with a predetermined prioritization order. For example, the voice communications may be assigned the highest prioritization, followed by the user computing device screen sharing, followed by the graphical elements from the agent support tools, with the agent video streaming having the lowest priority.

Various mechanisms may be used to adjust the transmission parameters of the modes of communication. For example, the bit rate of one or more of the non-voice communications modes may be reduced. Alternatively, other methods may be used to modify the communication parameters, such as, for example, adjusting the frame rate or changing the codec.

The changes in communication parameters to prioritize one or more communication modes may be initiated by the central control module 210 based on quality measurements sent by either the user computing device 100 over session control channel 230 or the agent computing device 150 over agent control channel 238. The instructions for adjustments to be made to the communication parameters are then transmitted by the central control module 210 back to the user computing device 100 over session control channel 230 or the agent computing device 150 over agent control channel 238, or both, depending on the type of parameter being changed. In cases where only one of the computing devices 100 or 150 controls the transmission parameters, the instructions may transmitted to only that device to implement the desired transmission parameter change so as to prioritize the voice communications between devices 100 and 150. In other cases, the instructions may be transmitted to both endpoints of the communication, e.g., user computing device 100 and agent computing device 150, so that each device may make the desired adjustment.

Support Content Overlay

Figure 3:
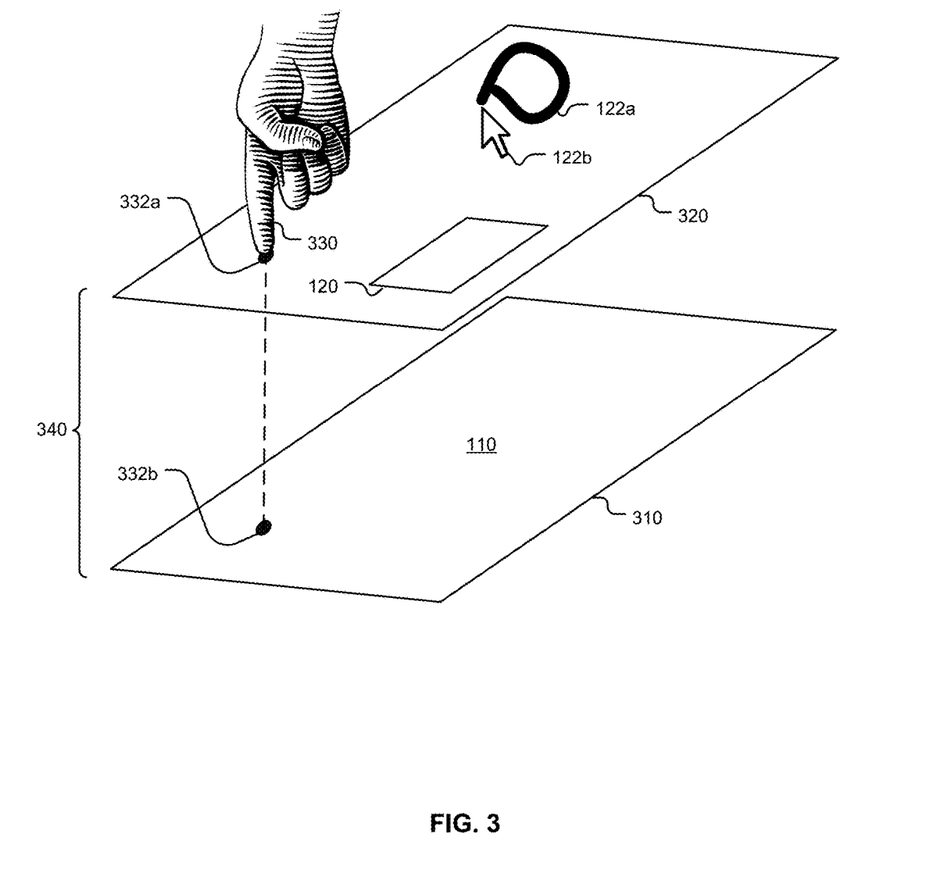
FIG. 3 illustrates the detection of touch inputs in a support session interface, in accordance with embodiments of the present invention.

FIG. 3 illustrates the detection of touch inputs in a support session interface, in accordance with embodiments of the present invention. As described above, a customer support agent at computing device 150 may generate graphical elements that are transmitted to the user computing device 100 to be displayed on the user computing device 100 on top of the user's user interface content 110. These graphical elements may be used by the agent to communicate with the user for customer support, troubleshooting, training, or other communication purposes.

During normal operation of the user computing device 100, the display component 102 displays UI content 110 in a UI layer 310. The UI layer 310 may comprise, for example, a window or frame filling all or a portion of the display area of the user computing device 100. The UI content 110 displayed in the UI layer 310 includes, for example, the operating system user interface or the interface of one or more software applications running on the user computing device 100.

When the customer support application is initiated, a support session interface 340 is displayed by the display component 102. The support session interface 340 may include multiple logical layers, with the content in each layer being combined and rendered in the support session interface 340. In the embodiment illustrated in FIG. 3, a support content layer 320 is generated and displayed on top of the UI layer 310 in the support session interface 340. The support content layer 320 is transparent, so as to enable the user to view all of the content displayed in the UI layer 310 through the support content layer 320. However, any graphical elements generated by the agent computing device 150 and transmitted to the user computing device 100 are displayed in the support layer 320. These graphical elements may be partially transparent, thereby enabling the user to view the content in the UI layer 310 below, or opaque, thereby blocking the view of the content in the UI layer 310 below.

In the example described above with respect to FIG. 1, the agent interface element 120 displays a video image portion 124, an information portion 128, and controls 125*a*-125*b*. As shown in FIG. 3, the graphical content of the agent interface element 120 is rendered in the support content layer 320. Additional graphical elements created by the customer support agent may also be displayed in the support content layer 320, such as a pointer 122*b*, lines 122*a*, or other graphical elements created by the customer support agent for display on the user's computing device 100.

It may be desirable to permit the user to continue to interact with the elements displayed in the UI layer 310, even when the support content layer 320 is displayed overlaying the UI layer 310. On touch-enabled computing devices, the user may interact with the elements displayed on the computing device by touching one or more fingers 330 to the display. The contact of the finger 330 to the display is detected as a touch input by the computing device 100. When a transparent support content layer 320 is displayed on top of the UI layer 310, the user's touch input 332*a* may be detected by the computing device's hardware and passed to software producing the support content layer 320 (e.g., the support application 202) as an input command or input event. When the touch input 332*a* corresponds to a portion of the support content layer 320 that does not contain any control elements, the touch input 332*a* is forwarded from the support application 202 to the software producing the UI layer 310 (e.g., the computing device's operating system or software application) as a touch input 332*b* to the same location on the display as the original touch input 332*a*.

In this way, the user may continue to interact with the underlying UI content displayed in the UI layer 310 while the support agent is providing support to the user. This may be particularly useful when the support agent is teaching the user how to perform an operation. The support agent may create graphical elements, such as lines 122*a* or pointers 122*b*, on the user's display to direct the user to the appropriate element, control, or relevant portion of the UI content, while simultaneously guiding the user via voice communications. In some embodiments, it may be desirable for the user to passively observe the support agent's control of the user's computing device 100. However, in other embodiments, it may be desirable for the user to interactively follow the support agent's graphical, textual, and/or audio guidance to perform the desired tasks.

In accordance with embodiments of the present invention, audio communications between the user and the customer support agent may be provided via a telephone call from the user's residential telephone system or mobile telephone. The telephone call between the user and the customer support agent may be initiated before or after the support application 202 is launched on the user computing device 100 and the customer support session is initiated between the user computing device 100 and the agent computing device 150.

In order to initiate a telephone call to a customer support agent before launching the support application 202, the user may dial a predetermined customer service number using any conventional telephone system or telephone network. If, during the course of that telephone call, the user launches the support application 202, the existing telephone call between the user and the support agent will be associated with the customer support session initiated between the user computing device 100 and the agent computing device 150. This association may be established automatically by the central control module 210 when the support application 202 initiates the support session if the user has already provided identifying information during the telephone call. This identifying information may comprise a user login, device name, telephone number associated with the user computing device 100, or other information that may be used to uniquely identify the user computing device 100, and may be provided manually using telephone keypress entries, verbally to the support agent, or automatically via caller identification. The central control module 210 can then route the support session request from the support application 202 to the agent computing device 150 of the customer support agent already on the telephone with the user. The user and the customer support agent may then continue the telephone call in conjunction with the screen sharing and graphical support content described above.

Alternatively, the support agent may verbally convey telephone session identifying information to the user. The user may then manually enter this telephone session identifying information (such as, e.g., a session identification number) into the support application 202 when initiating the support session. The central control module 210 can use this telephone session identifying information to route the support session to the customer support agent already on the phone with the user.

In other embodiments, the user may initiate the support session between the user computing device 100 and the agent computing device 150 before a telephone call is established with the customer support agent. This may be desirable when the user computing device 100 does not support bidirectional audio communications (e.g., the user computer device 100 does not have a microphone or voice communications capability) or if the network connectivity is inadequate to support a reliable voice communication session. After the user launches the support application 202, the user may be prompted to select whether the user wishes to establish voice communications with the support agent via the user computing device 100 or via a separate telephone call. If the user selects a telephone call, the user may be prompted to enter a telephone number where the user may be contacted, or the user may be provided with a telephone number for contacting the customer support agent.

Figure 4:
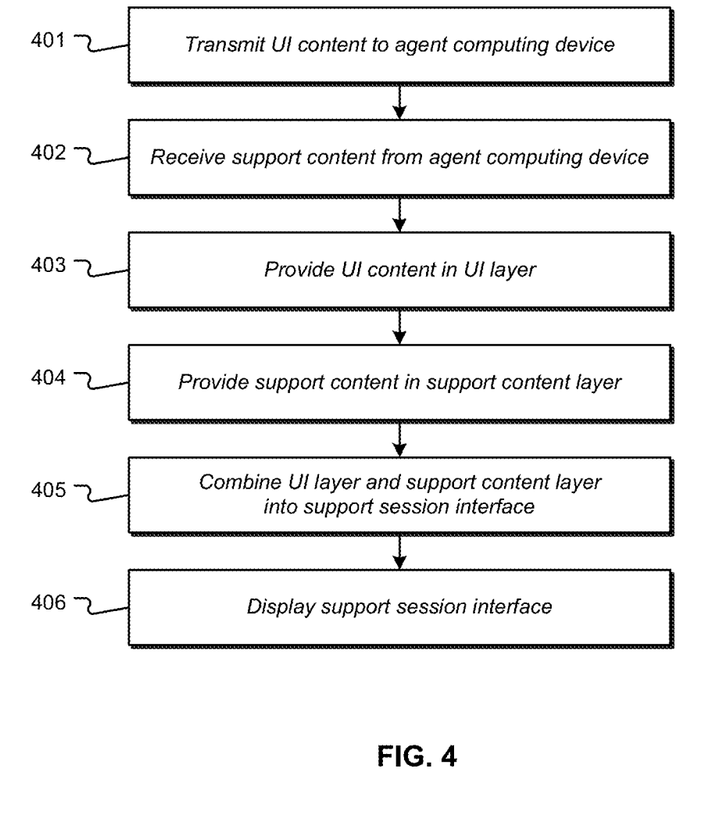
FIG. 4 is a flowchart illustrating a method of providing remote support, in accordance with embodiments of the present invention.

FIG. 4 is a flowchart illustrating a method of providing remote support, in accordance with embodiments of the present invention. In step 401, user interface ("UI") content is transmitted from a user computing device to an agent computing device. In step 402, graphical support content is received from the agent computing device. In step 403, UI content is provided in a UI layer. In step 404, the graphical support content is provided in a support content layer. In step 405, the UI layer and the support content layer are combined into a support session interface with the support content layer being rendered overlaying the UI layer. In step 406, the support session interface is displayed on the user computing device 100.

In embodiments described above, remote support of a user computing device 100 is provided by a customer support network 200. This network 200 may be provided, for example, by the manufacturer or retailer of the device 100 or of software operating on the device. In accordance with other embodiments of the present invention, support of a user computing device may be provided by another remote user. The remote user may operate a remote user computing device that may establish a support session directly with the user computing device 100 over a network, or the support session may be coordinated by the central control module 210. The remote user at the remote user computing device may be provided with the same or similar software or functionality described above with respect to the customer support agent computing device 150. However, instead of the remote support being provided by a corporate support service, the remote support may be provided by a family member or friend of the user at the user computing device 100.

In other embodiments, the support software may be incorporated into a third party software application. The third party software application may include code for initiating a support session between the user computing device 100 and the customer support network 200 that may be operated by a company different from the third party software application developer. In this way the customer support network 200 and associated functionality described herein may be utilized by many different companies to provide enhanced customer support experiences.

Other embodiments of the present invention may be used in environments other than the customer support examples provided above. For example, some embodiments may be used for instructional purposes, such as a classroom or online learning environment. The teacher may utilize a support application with similar functionality as the customer support application described above, for interacting with a student's computing device. In some embodiments, the support application may provide the ability to interact with multiple computing devices, such as all of the computing devices used by a group of students in a class (e.g., a single physical classroom containing all of the students, or a virtual classroom with students physically located in different locations). The support application may enable the teacher to transmit graphical elements and/or share the teacher's screen with the students, and may further enable the teacher to select a screen sharing session with one of those students to view the content on that particular student's computing device.

Other embodiments of the present invention may be utilized in any other context in which one or more user computing devices communicate with one or more support computing devices via one or more one-way or two-way communication channels.

Figure 5:
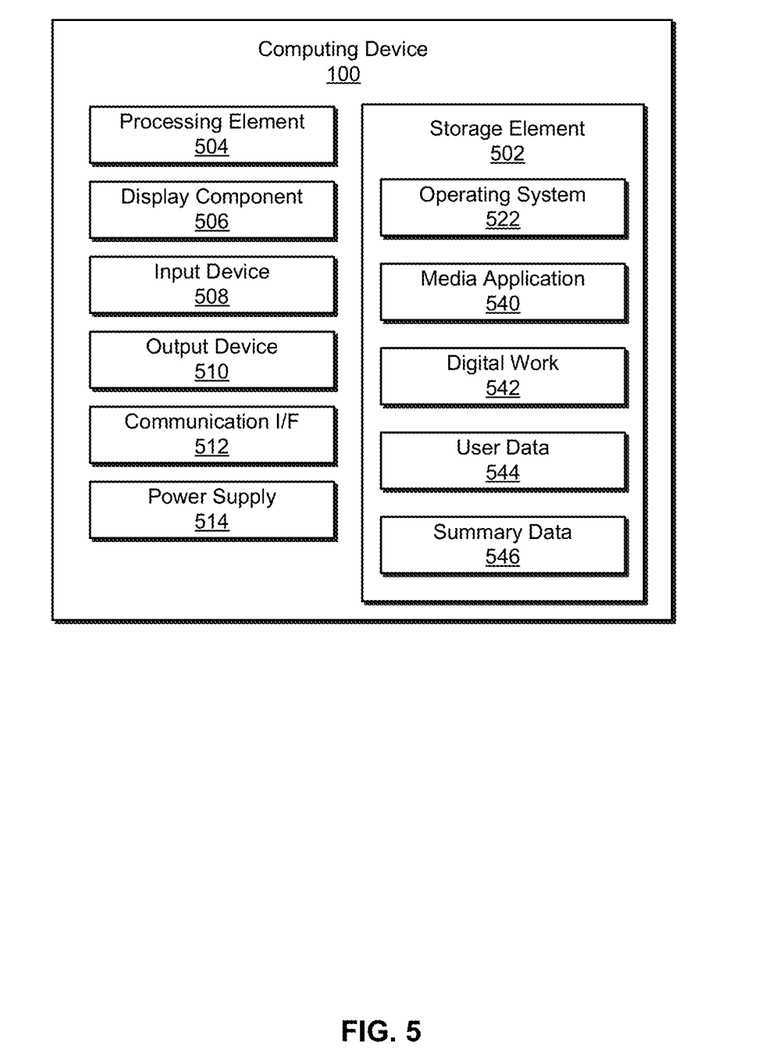
FIG. 5 illustrates an exemplary block diagram of a user computing device, in accordance with embodiments of the present invention.

FIG. 5 illustrates an exemplary block diagram of a user computing device 100, in accordance with embodiments of the present invention. The computing device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein. The electronic device 100 may not necessarily be a mobile or portable device, and thus, in some implementations may comprise a desktop personal computer, a gaming system, a television, other home electronics devices, and other devices providing media presentation functionality.

The computing device 100 may include a display component 506. The display component 506 may comprise, for example, one or more devices such as cathode ray tubes (CRTs), liquid crystal display (LCD) screens, gas plasma-based flat panel displays, LCD projectors, or other types of display devices, etc.

The computing device 100 may include one or more input devices 508 operable to receive inputs from a user. The input devices 508 can include, for example, a push button, touch pad, touch screen, wheel, joystick, keyboard, mouse, trackball, keypad, accelerometer, light gun, game controller, or any other such device or element whereby a user can provide inputs to the computing device 100. These input devices 508 may be incorporated into the computing device 100 or operably coupled to the computing device 100 via wired or wireless interface. For computing devices with touch sensitive displays, the input devices 508 can include a touch sensor that operates in conjunction with the display component 506 to permit users to interact with the image displayed by the display component 506 using touch inputs (e.g., with a finger or stylus).

The computing device 100 may also include at least one communication interface 512, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 100 may also include one or more wired communications interfaces for coupling and communicating with other devices.

The computing device 100 may also include a power supply 514, such as, for example, a rechargeable battery operable to be recharged through conventional plug-in approaches, or through other approaches such as capacitive charging.

The computing device 100 also includes a processing element 504 for executing instructions and retrieving data stored in a storage element 502. As would be apparent to one of ordinary skill in the art, the storage element 502 can include one or more different types of memory, data storage or computer-readable storage media, such as, for example, a first data storage for program instructions for execution by the processing element 504, a second data storage for images or data and/or a removable storage for transferring data to other devices.

The storage element 502 may store software for execution by the processing element 504, such as, for example, operating system software 522 and media application 540. The storage element 502 may also store data, such as, for example, files corresponding to one or more digital works 542, user data 544 relating to the user's consumption of those digital works 542 and other device metrics, and summary data 546 relating to the digital works 542, as will be described in greater detail below.

Embodiments of the present invention may provide numerous advantages. For example, many conventional customer support methods are designed for use with customers having a personal computer with a keyboard, mouse input device, and the ability to display multiple software applications simultaneously in separate windows. These customer support methods are not well suited to tablet computing devices, which lack external user input peripherals and typically only display a single application at a time. In addition, embodiments of the present invention may permit customer support using multiple modes of communication simultaneously, while accommodating bandwidth limitations by adjusting the quality of those communication modes to prioritize the most critical mode or modes. Finally, embodiments of the present invention may provide improved methods of remotely guiding users via graphical support content overlaying the user interface content.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of providing customer support, comprising:
    sending user interface (UI) content displayed on a touchscreen display of a user computing device from the user computing device to a support agent computing device wherein the UI content comprises a button for operation of the user computing device;
    receiving support content from the support agent computing device, the support content comprising a graphical element, and the graphical element being generated by a customer support agent viewing the UI content at the support agent computing device;
    displaying on the touchscreen display of the user computing device the UI content in a UI layer and the support content in a support content layer, wherein displaying the UI content and the support content comprises combining the UI layer and the support content layer for display on the touchscreen display;
    displaying the graphical element overlaying the UI content such that the graphical element provides visual guidance to the button;
    while displaying the UI content in the UI layer and the support content in the support content layer, determining a touch input on hardware of the user computing device on the touchscreen display;
    sending, by the hardware, input data representing the touch input to a first support component associated with the support content layer;

determining, by the first support component, that the input data corresponds to a first location of the support content layer;
determining, by the first support component, an absence of control elements at the first location of the support content layer;
sending, by the first support component, the input data to a second component associated with UI content in the UI layer;
determining, by the second component, that the input data corresponds to a second location of the UI layer, wherein the button is located at the second location of the UI layer; and
performing an operation associated with the button.

2. The method of claim 1, wherein combining the UI layer and the support content layer comprises superimposing at least a first portion of the support content layer on top of at least a second portion of the UI layer, and wherein at least a third portion of the support content layer is transparent.

3. The method of claim 1, wherein the support content comprises a video stream of the customer support agent from the support agent computing device.

4. The method of claim 3, further comprising:
sending audio content between the user computing device and the support agent computing device; and
in response to detection of a degradation in audio content transmission quality between the user computing device and the support agent computing device, prioritizing transmission of the audio content over transmission of the video stream of the customer support agent.

5. A computer-implemented communication method, comprising:
sending user interface (UI) content from a first computing device to a second computing device, wherein the UI content comprises a UI control element for operation of the first computing device;
receiving support content comprising a graphical element from the second computing device;
displaying on a display component of the first computing device the UI content and the support content by combining a first layer comprising UI content and a second layer comprising support content from the second computing device;
displaying the graphical element overlaying the UI content such that the graphical element provides visual guidance to the UI control element;
determining, on hardware of the first computing device, an input corresponding to the UI control element;
sending, by the hardware, input data representing the input to a first component associated with the support content and the second layer;
determining, by the first component, that the input data corresponds to a first location of the second layer;
determining, by the first component, an absence of control elements at the first location of the second layer;
sending, by the first component, the input data to a second component associated with the UI control element and the first layer;
determining, by the second component, that the input data corresponds to a second location of the first layer, wherein the UI control element is located at the second location of the first layer; and
performing an operation associated with the input corresponding to the UI control element.

6. The method of claim 5, wherein combining the first layer and the second layer comprises superimposing at least a first portion of the second layer on top of at least a second portion of the first layer, and wherein at least a third portion of the second layer is transparent.

7. The method of claim 5, further comprising:
detecting touch inputs in a support application generating the support content in the second layer; and
sending the touch inputs to a UI application generating UI content in the first layer.

8. The method of claim 5, further comprising:
generating the graphical element by the second computing device with a drawing tool of a support software application.

9. The method of claim 8, further comprising generating an animated display of the graphical element.

10. The method of claim 5, wherein:
said support content from the second computing device comprises instructions for operating the first computing device.

11. The method of claim 5, further comprising:
sending audio content between the first computing device and the second computing device.

12. The method of claim 11, further comprising:
receiving a video stream from the second computing device; and
displaying the video stream in the second layer.

13. The method of claim 12, further comprising:
in response to detection of a degradation in audio content transmission quality between the first computing device and the second computing device, prioritizing sending of the audio content over sending of the video stream of a customer support agent viewing the UI content at the second computing device.

14. The method of claim 13, further comprising:
in response to receiving a first user input indicating initiation of a communication session, initiating a communication application on the first computing device, wherein said sending UI content and transmitting sending audio content are performed by the communication application; and
in response to receiving a second user input to the communication application indicating cessation of audio communications, terminating said transmission of the audio content to the second computing device.

15. The method of claim 5, further comprising:
receiving control inputs from the second computing device; and
executing the received control inputs on the first computing device.

16. The method of claim 5, further comprising:
retrieving a stored session, said stored session comprising a recorded history of UI content from the first computing device and support content from the second computing device.

17. A computing device, comprising:
a display;
a processing component; and
a computer-readable memory storing computer-executable instructions which when executed cause the processing component to perform a method comprising:
sending user interface (UI) content from the computing device to a second computing device, wherein the UI content comprises a UI control element for operation of a first computing device;
receiving support content comprising a graphical element from the second computing device;
displaying on the display component of the computing device the UI content and the support content by combining a first layer comprising UI content and a second layer comprising support content from the second computing device;

displaying the graphical element overlaying the UI content such that the graphical element provides visual guidance to the UI control element;

determining, on hardware of the first computing device, an input corresponding to the UI control element;

sending, by the hardware, input data representing the input to a first component associated with the support content and the second layer;

determining, by the first component, that the input data corresponds to a first location of the second layer;

determining, by the first component, an absence of control elements at the first location of the second layer;

sending, by the first component, the input data to a second component associated with the UI control element and the first layer;

determining, by the second component, that the input data corresponds to a second location of the first layer, wherein the UI control element is located at the second location of the first layer; and performing an operation associated with the input corresponding to the UI control element.

18. The computing device of claim 17, wherein the computer-executable instructions when executed cause the processing component to perform the method further comprising wherein combining the first layer and the second layer comprises superimposing at least a first portion of the second layer on top of at least a second portion of the first layer, and wherein at least a third portion of the second layer is transparent.

19. The computing device of claim 17, wherein the computer-executable instructions when executed cause the processing component to perform the method further comprising:

detecting touch inputs in a support application generating the support content in the second layer; and sending the touch inputs to a UI application generating UI content in the first layer.

20. The computing device of claim 17, wherein the computer-executable instructions when executed cause the processing component to perform the method further comprising:

sending audio content between the first computing device and the second computing device;

receiving a video stream from the second computing device;

displaying the video stream in the second layer; and in response to detection of a degradation in audio content transmission quality between the first computing device and the second computing device, prioritizing sending of the audio content over transmission of the video stream of a customer support agent viewing the UI content at the second computing device.

21. The computing device of claim 17, wherein the computer-executable instructions when executed cause the processing component to perform the method further comprising:

retrieving a stored session, said stored session comprising a recorded history of UI content from the computing device and support content from the second computing device.

22. A computer-implemented method of providing customer support, comprising:

establishing a display channel between a user computing device and a support agent computing device, said display channel communicating graphical image data comprising user interface (UI) content displayed on the user computing device in a first layer and support content displayed on the user computing device in a second layer;

establishing an audio channel between the user computing device and the support agent computing device, said audio channel communicating two-way audio stream data between the user computing device and the support agent computing device;

establishing a video channel between the user computing device and the support agent computing device, said video channel communicating streaming video data of a customer support agent at the support agent computing device;

establishing a communication control channel between the user computing device and the support agent computing device, said communication control channel communicating control information regarding the display channel, the audio channel, and the video channel;

in response to detecting a degradation in quality of communication between the user computing device and the support agent computing device, reducing a quality of service parameter of the display channel or the video channel;

determining, by hardware of the user computing device, an input corresponding to a UI control element displayed on the user computing device in the first layer;

sending, by the hardware, input data representing the input to a first component associated with the support content and the second layer;

determining, by the first component, that the input data corresponds to a first location of the second layer;

determining, by the first component, an absence of control elements at the first location of the second layer;

sending, by the first component, the input data to a second component associated with the UI control element and the first layer;

determining, by the second component, that the input data corresponds to a second location of the first layer, wherein the UI control element is located at the second location of the first layer; and performing, by the user computing device, an operation associated with the input corresponding to the UI control element.

23. The method of claim 22, further comprising:

retrieving a stored session, said stored session comprising a recorded history of the graphical image data comprising UI content, audio stream data communicated between the user computing device and the support agent computing device, and streaming video data of the customer support agent communicated to the user computing device.

24. The method of claim 1, further comprising:

displaying a second graphical element overlaying the UI content, wherein the second graphical element comprises a graphical animation providing guidance for inputting a touch gestures input.

25. The method of claim 1, further comprising:

establishing a media channel between the user computing device and the support agent computing device using a browser-based real-time communication protocol; and establishing an audio channel between the user computing device and the support agent computing device using a signaling communications protocol.

* * * * *